(12) United States Patent
Laing

(10) Patent No.: US 9,027,844 B2
(45) Date of Patent: May 12, 2015

(54) WATER DELIVERY SYSTEM AND VALVE FOR A SINK

(75) Inventor: Karsten Laing, Althuette (DE)

(73) Assignee: Xylem IP Holdings LLC, White Plains, NY (US)

(*) Notice: Subject to any disclaimer, the term of this patent is extended or adjusted under 35 U.S.C. 154(b) by 1335 days.

(21) Appl. No.: 12/718,538

(22) Filed: Mar. 5, 2010

(65) Prior Publication Data

US 2011/0214767 A1 Sep. 8, 2011

(51) Int. Cl.
*G05D 23/13* (2006.01)
*F16K 11/078* (2006.01)

(52) U.S. Cl.
CPC .......... *F16K 11/078* (2013.01); *G05D 23/1306* (2013.01)

(58) Field of Classification Search
CPC ..... F16K 11/00; F16K 11/078; F16K 31/002; F16K 19/00; G05D 23/1306; G05D 23/1313
USPC ............ 236/12.1, 12.13, 12.16, 12.21, 12.22; 137/337
See application file for complete search history.

(56) References Cited

U.S. PATENT DOCUMENTS

| | | | |
|---|---|---|---|
| 3,120,854 A | 2/1964 | Shimooka | |
| 3,597,588 A | 8/1971 | Kirschner et al. | |
| 3,805,836 A | * 4/1974 | Veale | 137/625.4 |
| 4,142,515 A | 3/1979 | Skaats | |
| 4,152,567 A | 5/1979 | Mayfield | |
| 4,201,518 A | 5/1980 | Stevenson | |
| 4,241,868 A | * 12/1980 | Perkins | 236/12.11 |
| 4,567,350 A | 1/1986 | Todd Jr. | |
| 4,604,515 A | 8/1986 | Davidson | |
| 4,606,325 A | 8/1986 | Lujan, Jr. | |
| 4,697,614 A | 10/1987 | Powers et al. | |
| 4,750,472 A | 6/1988 | Fazekas | |
| 4,762,980 A | 8/1988 | Insley | |
| 4,808,793 A | 2/1989 | Hurko | |
| 4,936,289 A | 6/1990 | Peterson | |
| 4,945,942 A | 8/1990 | Lund | |
| 5,042,524 A | 8/1991 | Lund | |
| 5,277,219 A | 1/1994 | Lund | |

(Continued)

FOREIGN PATENT DOCUMENTS

DE  36 19 217  12/1987
DE  197 12 051  9/1998

(Continued)

OTHER PUBLICATIONS

Grundfos Pumps Corporation, "The Wait Is Over Hot Water in an Instant", Brochure.

(Continued)

*Primary Examiner* — Jonathan Bradford
(74) *Attorney, Agent, or Firm* — RatnerPrestia

(57) ABSTRACT

A water delivery system is provided, including at least one sink with a faucet device having a cold water faucet part and a hot water faucet part, a cold water line to the at least one sink, a hot water line to the at least one sink, and a valve associated with the at least one sink allowing in an open state the transport of water between the hot water line and the cold water line and inhibiting in a closed state the transport of water between the hot water line and the cold water line, wherein the open state and the closed state of the valve depend solely on whether a differential pressure across the valve is below or above a threshold value.

24 Claims, 4 Drawing Sheets

(56) References Cited

U.S. PATENT DOCUMENTS

| | | |
|---|---|---|
| 5,323,803 A | 6/1994 | Blumenauer |
| 5,351,712 A | 10/1994 | Houlihan |
| 5,775,372 A | 7/1998 | Houlihan |
| 5,868,311 A | 2/1999 | Cretu-Petra |
| 5,941,275 A | 8/1999 | Laing |
| 5,944,221 A | 8/1999 | Laing et al. |
| 5,983,922 A | 11/1999 | Laing et al. |
| 6,026,844 A | 2/2000 | Laing et al. |
| 6,039,067 A | 3/2000 | Houlihan |
| 6,389,226 B1 | 5/2002 | Neale et al. |
| 6,536,464 B1 | 3/2003 | Lum et al. |
| 6,895,985 B2 | 5/2005 | Popper et al. |
| 7,073,528 B2 | 7/2006 | Kempf et al. |
| 7,740,182 B2 * | 6/2010 | Lum et al. .................. 236/12.13 |
| 7,773,868 B2 | 8/2010 | Moore |
| 7,832,421 B2 | 11/2010 | Laing |
| 2004/0182439 A1 | 9/2004 | Popper et al. |
| 2006/0016902 A1 | 1/2006 | Restivo, Sr. et al. |
| 2006/0289065 A1 | 12/2006 | Adams |
| 2007/0137709 A1 | 6/2007 | Kempf et al. |
| 2008/0105305 A1 | 5/2008 | Lum et al. |
| 2008/0230126 A1 | 9/2008 | Acker |
| 2009/0092384 A1 | 4/2009 | Luo et al. |
| 2010/0092164 A1 | 4/2010 | Ziehm |
| 2010/0096018 A1 | 4/2010 | Wylie et al. |
| 2010/0195991 A1 | 8/2010 | Deivasigamani et al. |
| 2011/0214767 A1 | 9/2011 | Laing |

FOREIGN PATENT DOCUMENTS

| | | |
|---|---|---|
| DE | 100 24 803 | 11/2000 |
| JP | 54129542 A | 10/1979 |
| JP | 2006145182 A | 6/2006 |
| WO | WO9843143 | 10/1998 |

OTHER PUBLICATIONS

Act, Inc., Metlund Hot Woater Demand System, Hot Water At the Push of a Button, Brochure.

Silicon Labs, Si4421 Universal ISM Band FSK Transceiver, Brochure.

Laing Thermotech, Inc. "How Hot Water Recirculating Systems Work," http://www.lainginc.com/howhot.htm (2001).

Laing Thermotech, Inc., "Laing Autocirc—How the Autocirc System Works," http://www.autocirc.com/Autocirc.htm (2001).

Laing Thermotech, Inc. , "Installation and Operating Manual," (2002).

Laing Thermotech, Inc., "Hot Water Recirculation—How It Works," www.grundfos.com.

* cited by examiner

WATER DELIVERY SYSTEM AND VALVE FOR A SINK

BACKGROUND OF THE INVENTION

The present invention relates to a water delivery system.

A typical water delivery system comprises one or several sinks, a cold water line to the sinks and a hot water line to the sinks. The hot water is heated, e.g., in a boiler. In such a system the problem arises that hot water in the hot water line cools down. When a hot water faucet is opened, the running water is initially cold water and only after some time does hot water flow.

As a remedy for this problem, it is well-known to re-circulate, while faucets are closed, hot water from the hot water line to the cold water line. Too strong a cooling-down of the hot water in the hot water line leading to the hot water faucet is thus prevented.

The invention also relates to a valve for a sink.

WO 98/43143 A1 discloses a regulator, in particular a circulation regulator for supplying warm water to a user, a combination set or other such consumer. A connection between a warm water pipe and a cold water pipe is established or interrupted in the regulator in accordance with the temperature.

U.S. Pat. No. 6,536,464 B1 discloses a thermostatically controlled bypass valve.

U.S. Pat. No. 6,895,985 B2 discloses a water delivery device comprising a hot water inlet coupled to a hot water pipe, a cold water inlet coupled to a cold water pipe, a first outlet operative to receive hot and cold water flows from the hot and cold water inlets and to facilitate water delivery to a user, and a circulation mechanism operative to allow circulation of water from the hot water pipe to the cold water pipe prior to delivery of water at a desired temperature to the user through that first outlet, wherein the circulation mechanism further includes a controller responsive to input from at least one temperature sensor and operative to control the circulation.

U.S. Pat. No. 7,073,528 B2 discloses a water pump and bypass valve sub-system for use in a water delivery system comprising a thermostatically controlled bypass valve.

U.S. Pat. No. 5,983,922 discloses a hot and cold water distribution system.

U.S. Pat. No. 3,120,854 discloses a fluid pressure equalizing assembly.

JP 2006-145182 discloses a header for a hot water supply system.

U.S. Pat. No. 4,945,942 discloses a plumbing system comprising a hot water recovery means for drawing hot water from a conduit means into a hot water source subsequent to withdrawal of hot water from the plumbing fixture, hot water withdrawn from the conduit being replaced by cold water passing through a one-way valve means.

U.S. Pat. No. 5,277,219 discloses a hot water recovery system.

U.S. Pat. No. 5,042,524 discloses a demand recovery hot water system comprising a transfer tank with a moveable piston.

SUMMARY OF THE INVENTION

In accordance with an embodiment of the present invention, a water delivery system is provided, the water delivery system comprising at least one sink with a faucet device comprising a cold water faucet part and a hot water faucet part, a cold water line to the at least one sink, a hot water line to the at least one sink, and a valve associated with the at least one sink allowing in an open state the transport of water between the hot water line and the cold water line and inhibiting in a closed state the transport of water between the hot water line and the cold water line, wherein the open state and the closed state of the valve depend solely on whether a differential pressure across the valve is below or above a threshold value.

In the present invention, the valve allowing the re-circulation of hot water is controlled solely by the differential pressure across the valve. The valve is not temperature-controlled. The valve can therefore be constructed in a simple way and, in particular, does not need to be connected to an electric power supply system. Consequently, no socket is needed for the valve.

The valve functions in a reliable manner. Also, the valve can be constructed in a symmetrical manner independently of the sign of the differential pressure.

In particular, the water delivery system comprises exactly one valve, even if several sinks are provided. When all faucet devices in the system, which are connected to the hot water line and the cold water line, are closed, the valve is open and hot water can be re-circulated. If any of the faucet devices is open and the differential pressure of the threshold value is reached, the valve inhibits the transport of water between the hot water line and the cold water line in the system.

If the valve is associated, where multiple sinks are provided, with the sink that is at the largest distance from a water heater with regard to the flow of hot water, maximum effect can be achieved since all sinks will have the benefit of the immediate availability of warm water. The opening of any faucet device in the system initiates the closing of the valve.

In one embodiment, a circulating pump is provided. The circulating pump, which, in particular, is positioned at a cold water line, can drive the transport of hot water.

It is advantageous if at least one temperature sensor is arranged in the hot water line, the at least one temperature sensor providing its sensor signals to the circulating pump. Via the sensor signals of the at least one temperature sensor, the circulating pump can be switched on or off or can be controlled (for example, in a proportional manner) to provide "fresh" hot water in the hot water line if too strong a temperature drop is detected.

It is particularly advantageous if the at least one temperature sensor sends its sensor signals in a wireless manner to the circulating pump. No wiring is then necessary between the circulating pump and the temperature sensor. In particular, it is advantageous if the at least one temperature sensor is arranged at the "last" sink in the water delivery system, which is at the furthest distance from a water heater.

The circulating pump can comprise a signal receiver for sensor signals transmitted in a wireless manner, and a control unit. Via the control unit the circulating pump is switched on and off or adjusted in dependence upon the measured temperature. The temperature of the water in the hot water line can thus be controlled.

In particular, the at least one temperature sensor is arranged in the vicinity of the valve or is arranged on the valve upstream or in front of a closing device of the valve with regard to the flow direction of hot water from a water heater. The temperature is then measured close to the sink in the hot water line that is provided with the valve. In one embodiment, the at least one temperature sensor is arranged on the valve. Accordingly, a valve can be provided with integrated temperature sensor and no additional temperature sensor need be installed on the hot water line.

It is advantageous if at least one battery is provided for energizing the at least one temperature sensor. The at least one temperature sensor does then not have to be connected to an electric power supply system. In particular, no socket close to a sink is needed for energizing the temperature sensor.

It is very advantageous if a switching state of the at least one valve is independent of a control state and, in particular, switching state of the circulating pump. The valve control and the circulating pump control are then independent of each other.

In particular, the valve is in the open state when the hot water faucet part and the cold water faucet part of the associated sink and any other faucet device in the system are closed. This can be achieved in a simple manner when the threshold pressure value is adjusted in such a way that it is above the highest pressure difference which can be reached via the circulating pump when the faucet device is closed.

The threshold value is reached when at least one of the hot water faucet part and the cold water faucet part or any other faucet device in the system is opened or open. When a faucet device is opened (on either the cold water side or hot water side), the differential pressure at the valve can be much higher than the differential pressure created by a circulating pump. The differential pressure caused by an open faucet can be, e.g., 40 to 50 times higher than the differential pressure caused by the pump. If the valve were to stay open during a time when a faucet is open, large amounts of hot water could enter the cold water line or vice versa which is highly undesirable. In the present invention, this transfer of large amounts of water can be prevented in a simple manner by closing the valve, said closing being controlled by reaching the pressure difference threshold value.

It is advantageous if the threshold value is larger than a maximum differential pressure caused by the circulating pump. Then, the circulating pump cannot cause closure of the valve.

In the present invention, the valve is operable without provision of electrical energy. This allows simple installation.

In particular, the valve comprises a hot water inlet, a cold water inlet, the hot water inlet and the cold water inlet being operatively connected, and a closing device for closing the connection between the hot water inlet and the cold water inlet if a differential pressure reaches a threshold value. The closing device is controlled via the differential pressure.

In particular, the closing device operates independently of the water temperature.

In a preferred embodiment, the closing device is adapted to operate independently of the sign of the threshold pressure. Accordingly, the valve can be closed if the pressure difference between the hot water region and a cold water region exceeds a threshold or between the cold water region and the hot water region exceeds the threshold. The value for the differential pressure threshold can be different for the aforementioned directions (signs).

In one embodiment, the valve comprises at least one channel, the channel connecting the hot water inlet and the cold water inlet, and the closing device is adapted to close the channel via at least one closing member. The position of the at least one closing member can be controlled via the pressure difference.

The pressure difference is, in particular, the difference between the pressure in a hot water region on one side of the channel and a cold water region on the other side of the channel. Thus, a direct pressure difference control is achievable.

In a normal state, the valve is open. It is also possible to adapt the valve as a non-return valve, in particular for periods during which the pump is switched off. This can be achieved, e.g., by a biasing force. For the valve to be open, a certain lower threshold pressure difference has to be reached.

In a preferred embodiment, the at least one closing member is spring-biased. Accordingly, a spring force can act to open the channel. The threshold value can be adjusted via dimensioning of the spring device.

For example, the channel has a first channel inlet and a second channel inlet, and the at least one closing member has a first closing member part and a second closing member part for closing at least one of the first channel inlet and the second channel inlet. A pressure difference-controlled water flow between the hot water region and the cold water region through the channel can thus be achieved.

In particular, the first closing member part and the second closing member part are connected by a connecting element. The connecting element is, e.g., a rod. Thus, a "synchronous" control is possible with synchronous movement of the first closing member part and the second closing member part.

In one embodiment, the first closing member part is biased by a first spring device and the second closing member part is biased by a second spring device. Accordingly, forces can act on both the first closing member part and the second closing member part. This allows, e.g., a symmetrical construction of the valve with a fine tuning of the pressure difference of the threshold value.

In particular, the first spring device is supported on the first area at the first channel inlet and the second spring device is supported on the second area at the second channel inlet. It is thus possible to provide a valve which functions in a safe manner and has small outer dimensions.

The at least one closing member is, in particular, linearly displaceable. Thus, the at least one closing member can be transferred in a simple manner from a closing position to an opening position and vice versa.

In one embodiment, the hot water inlet, the cold water inlet and the channel are arranged in one line. Consequently, a valve can be provided with small outer dimensions.

It is then advantageous if at least one of the hot water outlet and the cold water outlet is arranged transversely to this line. This allows simple installation of the valve under a sink.

In a preferred embodiment, a moveable wall is provided for separating a hot water region with a hot water inlet from a cold water region with a cold water inlet. The moveable wall can be flexible or displaceable and, in particular, displaceable in a linear manner. If the at least one closing member is fixed to the wall, the position of the wall determines whether a channel is open or closed.

In one embodiment, a spring device acts on the moveable wall and is supported on a wall of the hot water region or cold water region. Accordingly, the spring acts on the moveable wall in dependence upon the effective pressures.

In one embodiment, the channel comprises a channel region in which a closing member part is arranged. This closing member part can, in particular, close a channel inlet from one side.

It is then advantageous if the channel region is connected to a hot water region via an opening as channel inlet, and the first closing member part is provided for closing the opening at the side of the channel region, and a second closing member is provided for closing the opening at the side of the hot water region.

In an embodiment of the invention, a valve for a sink is provided, the valve comprising a hot water inlet, a cold water inlet, the hot water inlet and the cold water inlet being operatively connected, and a closing device for closing the connection between the hot water inlet and the cold water inlet if a differential pressure reaches a threshold value.

The invention is described herein, by way of example only, with reference to the accompanying drawings.

DETAILED DESCRIPTION OF THE INVENTION

Figure 1:
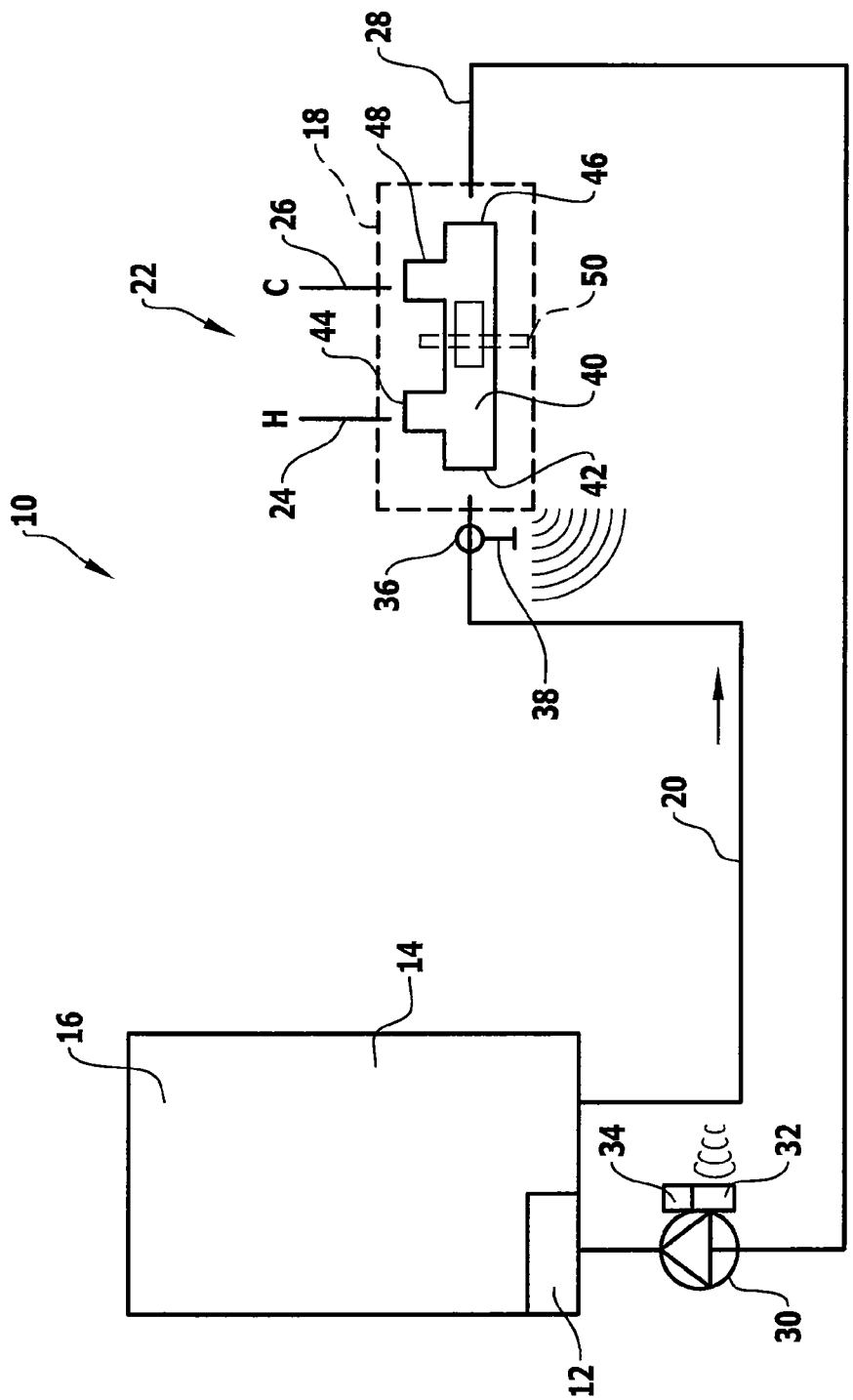
FIG. 1 is a schematic view of a hot water delivery system in accordance with an embodiment of the present invention.

A water delivery system in accordance with the present invention, which is schematically shown in FIG. 1 and designated by 10, comprises a heater 12 for heating water and thereby producing hot water from cold water. Preferably, the heater 12 is associated with a storage device 14 for hot water. For example, a boiler 16 is provided with integrated heater 12 and storage device 14.

The water delivery system 10 comprises one or more sinks 18. From the storage device 14, a hot water line 20 runs to the sink or sinks 18. The sink 18 has a faucet device 22 with a hot water faucet part 24 and a cold water faucet part 26. The hot water faucet part 24 and the cold water faucet part 26 can be separate and formed by individual faucets or they can be integrated in a single faucet.

The hot water line 20 is connected to the hot water faucet part 24.

The cold water faucet part 26 is connected to a cold water line 28.

A circulating pump 30 is arranged in the cold water line 28 in such a way that by through put of water through the heater 12 hot water can be transported to the sink 18.

The circulating pump 30 comprises a signal receiver 32 for receiving wireless signals for controlling the pump 30. The signal receiver 32 is operatively connected to a control unit 34 which controls the operation of the circulating pump 30. In particular, via the control unit 34 the circulating pump 30 can be switched on and off to transport water in the water line system comprising the hot water line 20 and the cold water line 28.

In the vicinity of the at least one sink 18 a temperature sensor 36 is arranged in the hot water line 20. The temperature sensor 36 measures the temperature of the water in the hot water line 20 close to the sink 18.

If several sinks 18 are provided, the temperature sensor 36 is arranged in the hot water line 20 in the vicinity of the sink 18 that is at the largest distance from the heater 12.

The temperature sensor 36 comprises a transmitting device 38 for transmitting its sensor signals in a wireless manner to the signal receiver 32 of the circulating pump 30. Accordingly, in dependence upon the temperature measured at the position of the temperature sensor 36 in the hot water line 20, the circulating pump 30 can be switched on and off or adjusted with respect to its mass flow.

In particular, when the temperature is too low in the hot water line 20, as measured by the temperature sensor 36, the control unit 34 switches on the circulating pump 30 to provide "fresh" hot water to the hot water line 20 and thereby increase the temperature in the hot water line 20.

The temperature sensor 36 is preferably not connected to the electric power supply system of a building in which the sink or sinks 18 are arranged. The temperature sensor 36 is energized by "on-board" means. In particular, the temperature sensor 36 comprises one or more batteries for energizing it. Therefore, no socket on the power supply system need be provided for the temperature sensor 36.

The water delivery system 10 comprises exactly one valve 40, even when there are several sinks provided. This valve 40 is preferably associated with the sink 18 that is at the largest distance from the heater 12 with regard to the flow of hot water.

The temperature sensor 36 is arranged before a closing device 50 (see below) of the valve 40 in the direction of the flow of hot water to the hot water faucet part 24.

The valve 40 comprises a hot water inlet 42 connected to the hot water line 20. It can optionally comprise a hot water outlet 44 connected to the hot water faucet part 24. (It is also possible that the hot water line 20 is connected to the hot water faucet part 24 outside the valve.) The valve 40 comprises a cold water inlet 46 connected to the cold water line 28, and also a cold water outlet 48 connected to the cold water line 28.

The valve 40 further comprises a closing device (indicated schematically in FIG. 1 by 50), which allows, in an open state, the transport of water between the hot water inlet 42 and the cold water inlet 46. In particular, in the open state of the closing device 50 hot water can be re-circulated from the hot water line 20 into the cold water line 28. If hot water is re-circulated, the waiting time to get hot water upon opening the hot water faucet part 24 can be reduced since the re-circulating of hot water prevents too strong a cooling-down of the water in the hot water line 20.

In a preferred embodiment, the valve 40 is formed and arranged in such a way that, if necessary, also cold water can be transported from the cold water inlet 46 to the hot water inlet 42.

In a closed state of the valve 40, the hot water inlet 42 and the cold water inlet 46 are not connected to each other.

Water in the area of the hot water inlet 42 is under a pressure $p_1$. Water in the area of the cold water inlet 46 is under a pressure $p_2$. The pressure difference $p_1-p_2=\Delta p$ is the pressure difference across the valve 40. This pressure difference controls whether the valve is in the open state or in the closed state. In particular, if the pressure difference is below an (upper) pressure difference threshold value, the valve 40 is in the open state, thus allowing the re-circulation of hot water (or cold water). When this threshold value is reached, the valve 40 is closed by the closing device 50, thereby inhibiting this water transport.

In particular, the valve 40 is formed in such a way that it does not need electrical energy for its operation. The operation of the valve 40 is only controlled by the pressure difference $\Delta p$. Moreover, the valve 40 operates independently of the water temperature. The valve 40 is not controlled by the signals of the temperature sensors 36. In its ground state, when no fluid pressure forces are acting on the valve 40, the valve 40 is open allowing re-circulation. (In one embodiment, which is described in further detail below, a lower threshold pressure difference has to be reached before the valve opens and the valve closes when an upper threshold value is reached.)

In one embodiment, a temperature sensor 36 can be integrated into the valve 40. This integration relates to the mechanical arrangement of the temperature sensor 36 but without temperature control of the valve operation.

The threshold value is chosen in such a way that it is higher than the maximum differential pressure that can be reached by the circulating pump. Typically, the lift of a circulating pump in a water delivery system is six feet. Therefore, the pressure difference threshold value is larger than a differential pressure corresponding to a lift of six feet.

Figure 2:
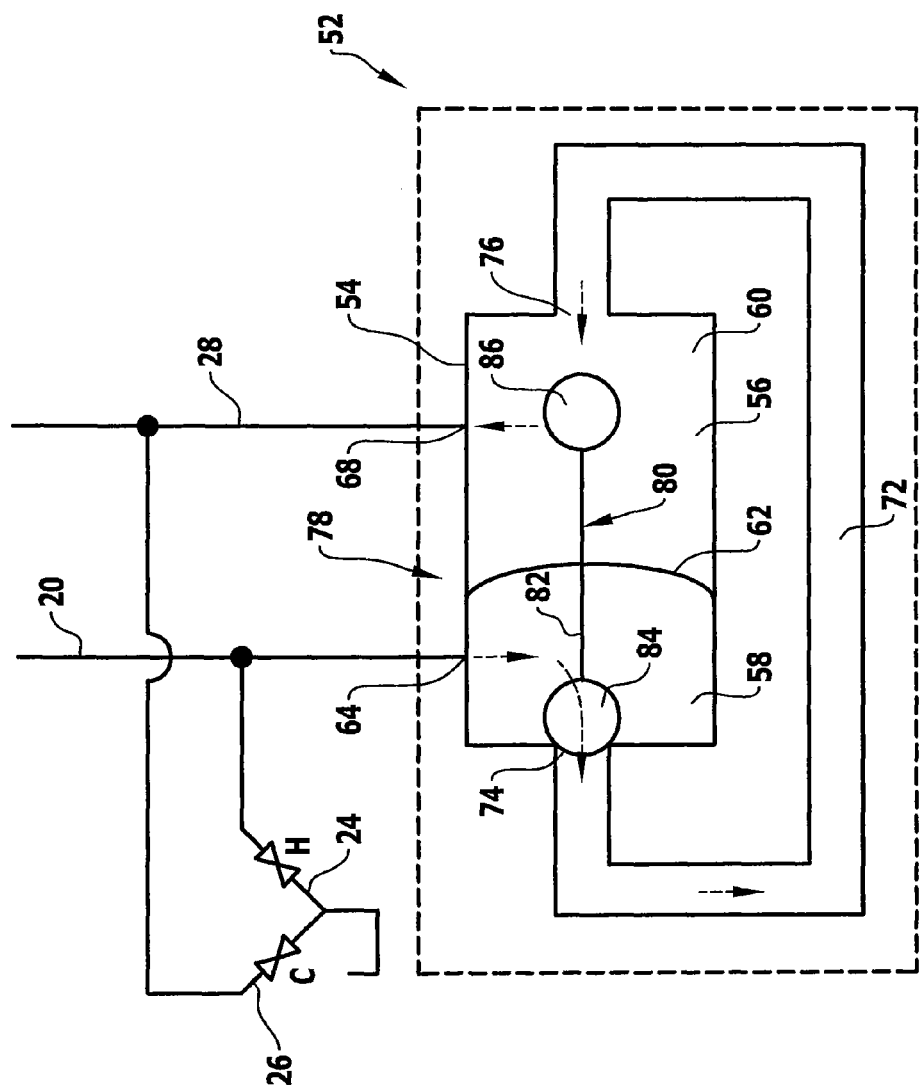
FIG. 2 is a schematic, cross-sectional view of a first embodiment of a valve in accordance with the present invention.

A first embodiment of a valve in accordance with the present invention, which is schematically shown in FIG. 2 and designated there by 52, comprises a housing 54 with an inner space 56. The inner space 56 is divided into a hot water region 58 and a cold water region 60. The hot water region 58 and the cold water region are separated by a wall 62 in a fluid-tight manner. The wall 62 is a flexible membrane.

The valve 52 comprises a hot water inlet 64 via which the hot water line 20 is connected to the hot water region 58. The hot water line 20 is also directly connected to the hot water faucet part 24.

The valve 52 comprises at the cold water region 60 a cold water inlet 68 via which the valve 52 is connected to the cold water line 28. The cold water line 28 is also directly connected to the cold water faucet part 26.

The valve 52 further comprises a channel 72 between the hot water region 58 and the cold water region 60. The channel 72 is arranged outside the housing 54 connecting the hot water region 58 and the cold water region 60 and thereby connecting the hot water inlet 64 and the cold water inlet 68.

The channel 72 comprises a first channel inlet 74 at the hot water region 58, and a second channel inlet 76 at the cold water region 60.

A closing device 78 of the valve 52 comprises a closing member 80 which is fixed to the membrane-like wall 62. The closing member 80 itself comprises a connecting member 82, which is, e.g., a rod.

A part of the closing member 80 is arranged inside the hot water region 58 and the other part is arranged inside the cold water region 60.

The closing member 80 comprises a first closing member part 84 which is associated with a first channel inlet 74. Via the first closing member part 84 the first channel inlet 74 can be closed. The first closing member part 84 is arranged completely inside the hot water region 58.

The closing member 80 further comprises a second closing member part 86 which is associated with the second channel inlet 76. The second closing member part 86 is for closing the second channel inlet 76.

For example, the first closing member part 84 and the second closing member part 86 are ball-shaped with a diameter which is larger than the diameter of the corresponding channel inlet 74, 76. Consequently, the corresponding closing member part 84, 86 can plunge partially into the channel 72 at the corresponding channel inlet 74, 76 to close this channel inlet 74, 76.

The connecting member 82 connects the first closing member part 84 and the second closing member part 86.

The connecting member 82 is formed in a symmetrical manner so that the transport of cold water from the cold water region 60 to the hot water region 58 is possible and also the transport of hot water from the hot water region 58 to the cold water region 60 is possible in dependence upon the sign of the pressure difference between the hot water region 58 and the cold water region 60.

The valve 52 operates as follows:

FIG. 2 shows the valve 52 in a closed state inhibiting transport of water between the hot water region 58 and the cold water region 60.

In the open state of the valve 52, neither the first closing member part 84 nor the second closing member part 86 closes the channel 72 at the corresponding first channel inlet 74 or second channel inlet 76.

If the pressure in the hot water line 20 is slightly higher than in the cold water line 28 (which is usually the case when the faucet device 22 with its hot water faucet part 24 and its cold water faucet part 26 is closed), then hot water from the hot water line 20 can flow through the hot water region 58 and the channel 72 into the cold water region 60 and from there into the cold water line 28.

This open state of the valve 52 prevails when the faucet is closed, i.e., the hot water faucet part 24 and the cold water faucet part 26 are closed. A re-circulation of hot water is thereby enabled.

The arrows in broken lines in FIG. 2 show the path of hot water when the valve 52 is open and hot water is re-circulated into the cold water line 28.

If the pressure difference reaches the threshold value by opening the hot water faucet part 24 or cold water faucet part 26 or any other faucet device on the line, the flexible wall 62 moves with the connecting member 82. Depending on the sign of this pressure difference threshold value, either the first channel inlet 74 or the second channel inlet 76 is closed. In particular, a re-circulation of hot water is then not possible anymore.

The transition between the closed state and the open state and the transition between the open state and the closed state takes place via movement of the flexible wall 62 and is controlled solely by the pressure difference between the hot water region 58 and the cold water region 60 and hence by the pressure difference between the hot water inlet 64 and the cold water inlet 68. The open and closed states of the valve 52 are temperature-independent and no electric power supply is necessary.

In particular, no socket under the sink is necessary for an electric power supply to the valve 52.

Figure 3:
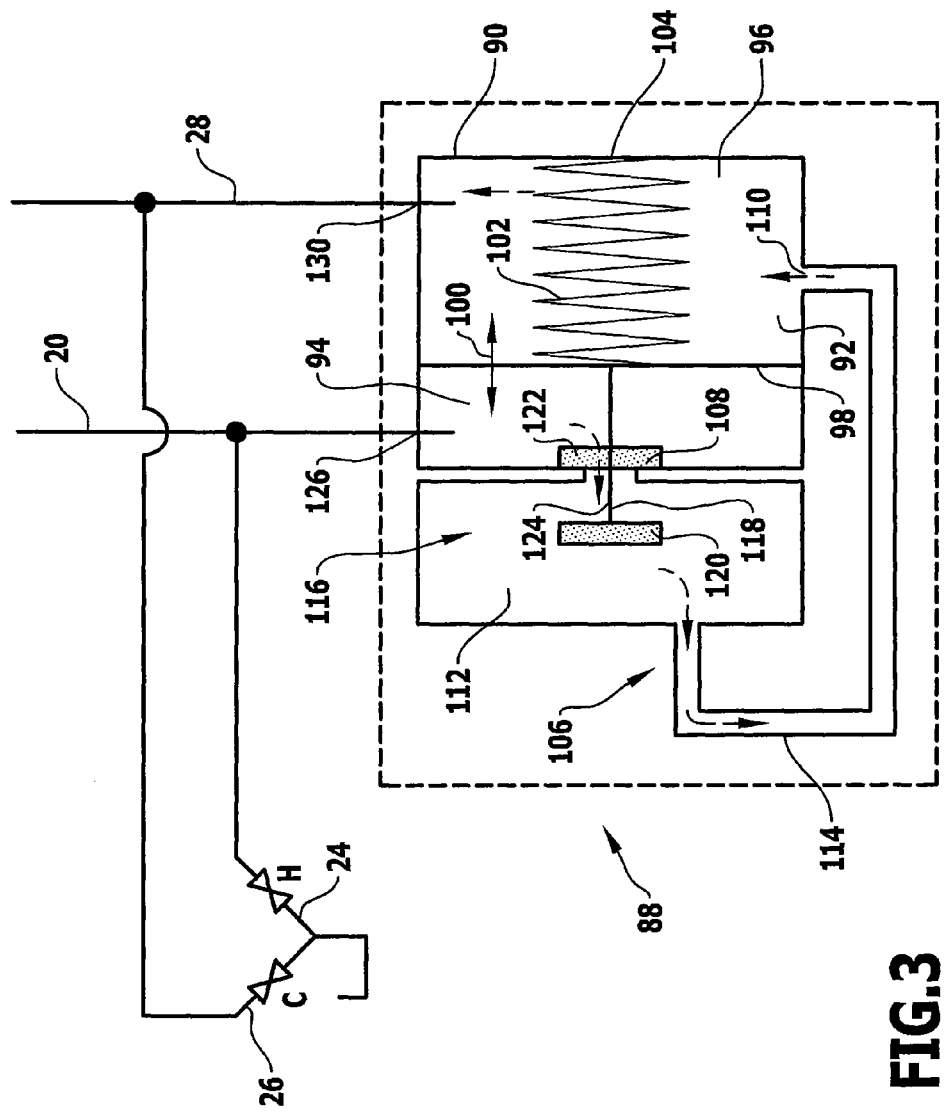
FIG. 3 is a schematic, cross-sectional view of a second embodiment of a valve in accordance with the present invention.

A second embodiment of a valve in accordance with the present invention, which is schematically shown in FIG. 3 and designated there by 88, comprises a housing 90 with an inner space 92. The inner space 92 is divided into a hot water region 94 and a cold water region 96. The hot water region 94 and the cold water region 96 are separated by a wall 98. This wall 98 provides a fluid-tight separation between the hot water region 94 and the cold water region 96. The wall 98 is linearly displaceable in a direction/counter-direction 100.

A spring device 102 acts on the wall 100. This spring device 102 is supported on a wall 104 of the container 90, which lies opposite the wall 98. The spring device 102 is arranged in the cold water region 96.

The valve 88 comprises a channel 106. This channel 106 has a first channel inlet 108 in the hot water region 94, and a second channel inlet 110 in the cold water region 96.

The channel comprises a first portion 112 with the first channel inlet 108, and a second portion 114. The second portion 114 leads from the first portion 112 to the cold water region 96.

Between the first portion 112 and the hot water region 94 an opening is provided, which includes the first channel inlet 108.

A closing device 116 of the valve 88 comprises a closing member 118. This closing member 118 is attached to the wall 98 and moveable in the direction/counter-direction 100 with the wall 98. The closing member comprises a first closing member part 120 which is arranged in the first portion 112 of the channel 106, and a second closing member part 122 which is arranged in the hot water region 94. The first closing member part 120 and the second closing member part 122 are connected by a connecting member 124 which is fixed on the wall 104.

In FIG. 3 a closed state of the valve 88 is shown. The second closing member part 122 closes the first channel inlet 108 from the side of the hot water region 94.

In FIG. 3, the flow path of hot water is shown with arrows in broken lines if the valve 88 is open and hot water is re-circulated into the cold water line 28.

The valve 88 functions as follows:

The spring device 102 presses without counter-pressure in the hot water region 94 via the wall 98 the second closing member 122 against a corresponding wall of the container 90, thereby closing the first channel inlet 108. If the water pressure bias force on the wall 98 in the hot water region 94 is larger than the bias force of the spring device 102, then the second closing member 122 is moved away from the first channel inlet 108 and the channel 106 is then open, thereby allowing transport of hot water between the hot water line 20 and the cold water line 28 (re-circulation of hot water).

If the water pressure in the hot water region 94 is too high and, in particular, reaches a threshold value, then the second closing member part 122 closes the first channel inlet 108 from the side of the first portion 112 of the channel 106.

Accordingly, if a negative or positive pressure difference threshold is reached, either the first closing member 120 or the second closing member 122 closes the first channel inlet 108 and thereby inhibits transport of water between the hot water region 94 and the cold water region 96.

The hot water line 20 is connected to the hot water region 94 via a hot water inlet 126. The hot water line 20 is also directly connected to the hot water faucet part 24.

The cold water line 28 is connected to the cold water region 96 via a cold water inlet 130. The cold water line 28 is also directly connected to the cold water faucet part 26.

The valve 88 can also work as a non-return valve. The spring device 102 biases the closing member 122 in such a way that the channel 106 is closed when the pressure difference is under a lower threshold value. This lower threshold value is much lower than the threshold value which closes the channel when a faucet device is opened. The pressure difference can fall under the lower threshold value if, e.g., the circulating pump 30 is switched off.

Figure 4:
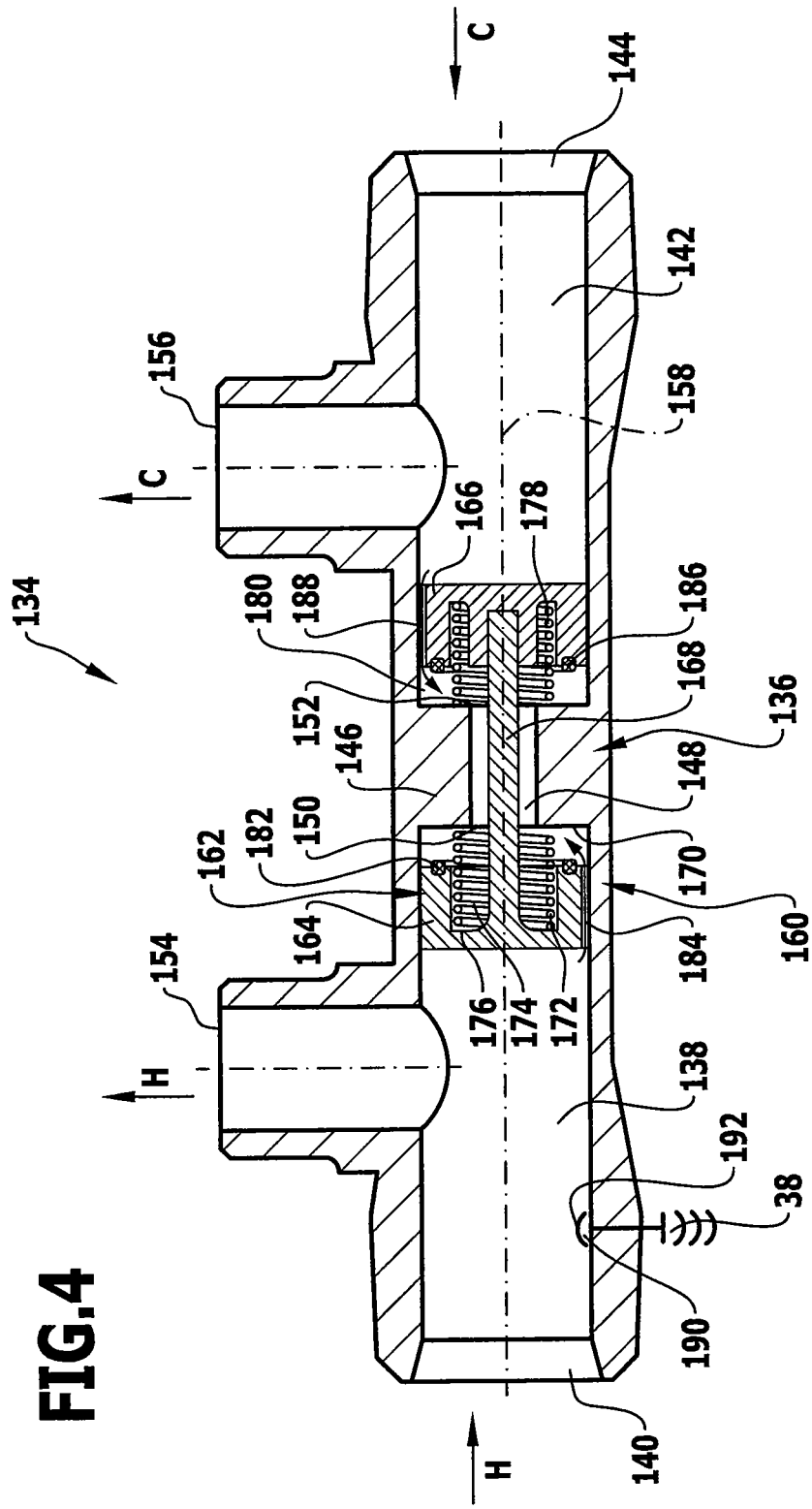
FIG. 4 is a schematic, cross-sectional view of a third embodiment of a valve in accordance with the present invention.

A third embodiment of a valve in accordance with the present invention, which is shown in FIG. 4 and designated by 134, comprises a housing 136. The housing has a first interior space 138 which is preferably of cylindrical shape. A hot water inlet 140 is connected to this first interior space 138.

Further, the housing 136 defines a second interior space 142 which is connected to a cold water inlet 144. The hot water inlet 140 can be connected to the hot water line 20. The cold water inlet 144 can be connected to the cold water line 28.

The second interior space 142 is preferably of cylindrical shape.

A ring-like structure 146 is arranged between the first interior space 138 and the second interior space 142. A channel 148 is arranged in this ring-like structure 146. The channel 148, which is arranged inside the housing 136, connects the first interior space 138 and the second interior space 142. The channel 148 has a smaller diameter than the first interior space 138 and the second interior space 142. The channel 148 is preferably of cylindrical structure. The channel 148 has a first channel inlet 150 to the first interior space 138 and a second channel inlet 152 to the second interior space 142.

The hot water inlet 40, the channel 148 and the cold water inlet 144 are arranged in a line one behind the other.

Connected to the first interior space 138 is a hot water outlet 154. Connected to the second interior space 142 is a cold water outlet 156. The hot water outlet 154 can be connected to the hot water faucet part 24. The cold water outlet 156 can be connected to the cold water faucet part 26.

The hot water outlet 154 and the cold water outlet 156 are arranged transversely and, in particular, perpendicularly to the line 158 on which the hot water inlet 140, the channel 148 and the cold water inlet 154 are arranged in a subsequent manner.

The valve 134 comprises a closing device 160 with a closing member 162. The closing member 162 has a first closing member part 164 positioned in the first interior space 138, and a second closing member part 166 arranged in the second interior space 142. The first closing member part 164 and the second closing member part 166 are connected by a connecting element 168. This connecting element 168 is, in particular, a rod. This rod is fixed to the first closing member part 164, the second closing member part 166 and is led through the channel 148. It has a diameter smaller than the diameter of the channel 148.

The closing member 162 is guided via its closing member parts 164 and 166 in the housing 136.

The ring-like structure 146 defines a first area 170 at the first channel inlet 150. This first area 170 is, in particular, ring-shaped.

A first spring device 172 is supported on this first area 170 and is also supported on the first closing member part 164. For this purpose, the first closing member part 164 has a ring-shaped inner space 174. The first spring device 172 is arranged in this inner space 174 so as to act on a "floor" 176 delimiting this inner space 174. The first spring device 172 is arranged around the connecting element 168.

The second closing member part 166 is formed in a similar way. A second spring device 178 is supported on a second area 180 which is formed on the ring-like structure 146 facing the second interior space 142. The second area 180 is at the second channel inlet 152.

The second spring device 178 is also supported on the second closing member part 166.

The first spring device 172 exerts a biasing force on the closing member 162 so as to move the first closing member part 164 away from the first channel inlet 150. The second spring device 178 exerts such a biasing force on the second closing member 166 so as to move the second closing member part 166 away from the second channel inlet 152.

The first closing member part 184 comprises a sealing 182. The sealing 182 is, in particular, in the form of an O-ring. The sealing 182 is arranged on a side of the first closing member part 174 facing the first area 170. When the sealing 182 contacts the first area 170, the first channel inlet 150 is closed.

The first closing member part 164 has a diameter which is smaller than the diameter of the first interior space 138 in the region in which the first closing member part 164 is arranged. Therefore, one or more channels 184 are provided, via which water can flow from a region of the first interior space 138 (which is a hot water region) to the first channel inlet 150 passing by the first closing member part 164. Alternatively it is also possible for channels corresponding to the channel 184 for the passage of water to be arranged in the first closing member part 164.

The second closing member part 166 is constructed in a similar way with a second sealing 186 facing the second area 180. When the second sealing 186 contacts the second area 180, the second channel inlet 152 is closed.

Furthermore, the second closing member part 166 comprises one or more channels 188 corresponding to channel 184, or such channel or channels 188 are arranged between the second closing member part 166 and a corresponding wall of the housing 136.

The valve 134 functions as follows:

If the pressure difference Δp is below the predetermined threshold value, neither the first closing member part 164 nor the second closing member part 166 closes the channel 184 at the corresponding first channel inlet 150 and second channel inlet 152. The adjustment of the threshold value is effected by dimensioning of the first spring device 172 and the second spring device 178.

If the pressure difference reaches the threshold, then either the first closing member part 184 or the second closing member part 166 (depending on the sign of the pressure difference) closes the channel 148 and thereby inhibits water transport between the hot water inlet 140 and the cold water inlet 144.

In the open state of the valve 134, hot water can flow from the hot water inlet 140 through channel or channels 184, through channel 148, through channel or channels 188 to the cold water inlet 144, thereby enabling a hot water re-circulation.

If the threshold value is reached, in particular, when the hot water faucet part 24 and/or cold the water faucet part 26 or any other faucet on the line is opened or open, the channel 148 is closed.

When the pressure in the hot water region is higher than the pressure in the cold water region and the threshold value is reached, the first closing member part 164 closes the first channel inlet 150. When the pressure in the cold water region is higher than in the hot water region and the threshold value is reached, the second closing member part 166 closes the second channel inlet 152.

The valve 134 functions in a similar way to that described hereinabove in connection with the valves 40 and 88. No electrical energy is needed for operation of the valve 134. The operation of the valve 134 is independent of the temperature and independent of the operating state of the circulating pump.

It may be provided that a temperature sensor 190 is arranged with a sensing part 192 in the first interior space 138 (hot water region). The temperature sensor 190 comprises a transmitting device 38 as described hereinabove for transmitting its sensor signals in a wireless manner to the signal receiver 32 of the circulating pump 30. The sensor signals of the temperature sensor 190 do not control the valve 134.

REFERENCE NUMERALS 10 water delivery system
12 heater
14 storage device
16 boiler
18 sink
20 hot water line
22 faucet device
24 hot water faucet part
26 cold water faucet part
28 cold water line
30 circulating pump
32 signal receiver
34 control unit
36 temperature sensor
38 transmitting device
40 valve
42 hot water inlet
44 hot water outlet
46 cold water inlet
48 cold water outlet
50 closing device
52 valve (first embodiment)
54 housing
56 inner space
58 hot water region
60 cold water region
62 wall
64 hot water inlet
68 cold water inlet
72 channel
74 first channel inlet
76 second channel inlet
78 closing device
80 closing member
82 connecting member
84 first closing member part
86 second closing member part
88 valve (second embodiment)
90 housing
92 inner space
94 hot water region
96 cold water region
98 wall
100 direction
102 spring device
104 wall
106 channel
108 first channel inlet
110 second channel inlet
112 first portion
114 second portion
116 closing device
118 closing member
120 first closing member part
122 second closing member part
124 connecting member
126 hot water inlet
130 cold water inlet
134 valve (third embodiment)
136 housing
138 first interior space
140 hot water inlet
142 second interior space
144 cold water inlet
146 ring-like structure
148 channel
150 first channel inlet
152 second channel inlet
154 hot water outlet
156 cold water outlet
158 line
160 closing device
162 closing member
164 first closing member
166 second closing member
168 connecting element
170 first area
172 first spring device
174 inner space
176 floor
178 second spring device
180 second area
182 first sealing
184 channel
186 second sealing
188 channel 190 temperature sensor
192 sensing part

The invention claimed is:

1. Water delivery system, comprising:
at least one sink with a faucet device comprising a cold water faucet part and a hot water faucet part;
a cold water line to the at least one sink;
a hot water line to the at least one sink; and
a valve associated with the at least one sink allowing in an open state the transport of water between the hot water line and the cold water line and inhibiting in a closed state the transport of water between the hot water line and the cold water line,
wherein the valve includes (i) a hot water inlet for receiving hot water from the hot water line, (ii) a cold water inlet for receiving cold water from the cold water line, (iii) a channel connecting the hot water inlet to the cold water inlet, and (iv) a moveable closing device positioned within the channel for moving between a closed position that prevents mixing of the cold water and the hot water within the channel and an open position that permits mixing of the cold water and the hot water within the channel, wherein the moveable closing device is configured for closing the connection between the hot water inlet and the cold water inlet at a threshold value of differential pressure across the valve, wherein the closing device includes a first closing member part for closing a first port of the channel, a second closing member part for closing a second port of the channel, and a connecting member positioned within the channel for connecting the first closing member part to the second closing member part;
wherein movement of the valve from the open state towards the closed state of the valve depends solely on the differential pressure across the valve relative to the threshold value.

2. Water delivery system in accordance with claim 1, further comprising a circulating pump.

3. Water delivery system in accordance with claim 2, wherein at least one temperature sensor is arranged in the hot water line, said at least one temperature sensor providing its sensor signals to the circulating pump.

4. Water delivery system in accordance with claim 3, wherein the circulating pump comprises a signal receiver for sensor signals transmitted in a wireless manner, and a control unit, and wherein the circulating pump is switched on and off or adjusted in dependence upon a measured temperature via the control unit.

5. Water delivery system in accordance with claim 3, wherein the at least one temperature sensor is arranged in the vicinity of the valve or is arranged on the valve before a closing device of the valve with regard to the flow direction of hot water from a water heater.

6. Water delivery system in accordance with claim 2, wherein a switching state of the valve is independent of a control state of the circulating pump.

7. Water delivery system in accordance with claim 1, wherein the valve is in the open state when the hot water faucet part and the cold water faucet part of the associated sink and any other faucet device in the system are closed.

8. Water delivery system in accordance with claim 1, wherein the threshold value is reached when at least one of the hot water faucet part and the cold water faucet part or any other faucet device in the system is opened or open.

9. Water delivery system in accordance with claim 2 wherein the threshold value is larger than a maximum differential pressure caused by the circulating pump.

10. Water delivery system in accordance with claim 1, wherein the closing device operates independently of the water temperature.

11. Water delivery system in accordance with claim 1, wherein the closing device is adapted to operate independently of the sign of the threshold pressure.

12. Water delivery system in accordance with claim 1, wherein the pressure difference is the difference between the pressure in a hot water region on one side of the channel and a cold water region on the other side of the channel.

13. Water delivery system in accordance with claim 1, wherein the first closing member part is biased by a first spring device and the second closing member part is biased by a second spring device.

14. Water delivery system in accordance with claim 13, wherein the first spring device is supported on a first area at the first channel port, and the second spring device is supported on a second area at the second channel port.

15. Water delivery system in accordance with claim 1, wherein a first seal is associated with the first closing member part, and a second seal is associated with the second closing member part.

16. Water delivery system in accordance with claim 1, wherein the closing device is linearly displaceable.

17. Valve for a sink, said valve comprising:
a hot water inlet for receiving hot water from a hot water line;
a cold water inlet for receiving cold water from a cold water line;
wherein the hot water inlet and the cold water inlet are operatively connected by a channel; and
a moveable closing device for closing the connection between the hot water inlet and the cold water inlet at a threshold value of differential pressure across the valve,
wherein the closing device includes a first closing member part for closing a first port of the channel, a second closing member part for closing a second port of the channel, and a connecting member positioned within the channel for moving between a closed position that prevents mixing of the cold water and the hot water within the channel and an open position that permits mixing of the cold water and the hot water within the channel, wherein the moveable closing device is configured for connecting the first closing member part to the second closing member part;
wherein movement of the valve from the open state towards the closed state of the valve depends solely on the differential pressure across the valve relative to the threshold value.

18. Valve in accordance with claim 17, wherein the closing device operates independently of the water temperature.

19. Valve in accordance with claim 17, wherein the closing device is adapted to operate independently of the sign of the threshold pressure.

20. Valve in accordance with claim 17, wherein the pressure difference is the difference between the pressure in a hot water region on one side of the channel and a cold water region on the other side of the channel.

21. Valve in accordance with claim 17, wherein the first closing member part is biased by a first spring device, and the second closing member part is biased by a second spring device.

22. Valve in accordance with claim 21, wherein the first spring device is supported on a first area at the first channel port, and the second spring device is supported on a second area at the second channel port.

23. Valve in accordance with claim 17, wherein a first seal is associated with the first closing member part, and a second seal is associated with the second closing member part.

24. Valve in accordance with claim 17, wherein the closing device is linearly displaceable.

\* \* \* \* \*